US009461674B2

(12) United States Patent
Yarga et al.

(10) Patent No.: US 9,461,674 B2
(45) Date of Patent: Oct. 4, 2016

(54) ELECTRONIC DEVICE WITH ANTENNAS ISOLATED USING PHASE SHIFTER

(71) Applicant: Apple Inc., Cupertino, CA (US)

(72) Inventors: Salih Yarga, Sunnyvale, CA (US); Miroslav Samardzija, Mountain View, CA (US); Qingxiang Li, Mountain View, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/050,023

(22) Filed: Oct. 9, 2013

(65) Prior Publication Data

US 2015/0099474 A1     Apr. 9, 2015

(51) Int. Cl.
*H04B 1/40*     (2015.01)
*H04B 1/00*     (2006.01)
*H01Q 1/22*     (2006.01)
*H01Q 1/24*     (2006.01)
*H01Q 1/52*     (2006.01)
*H01Q 5/371*    (2015.01)
*H01Q 9/42*     (2006.01)
*H01Q 21/28*    (2006.01)

(52) U.S. Cl.
CPC .......... *H04B 1/0064* (2013.01); *H01Q 1/2266* (2013.01); *H01Q 1/243* (2013.01); *H01Q 1/521* (2013.01); *H01Q 5/371* (2015.01); *H01Q 9/42* (2013.01); *H01Q 21/28* (2013.01)

(58) Field of Classification Search
CPC .... H04B 1/3833; H04B 1/3838; H04B 1/40; H04B 1/3822; H04B 1/406
USPC ................................................ 455/77, 575.7
See application file for complete search history.

(56) References Cited

U.S. PATENT DOCUMENTS

| 6,879,293 B2 | 4/2005 | Sato | |
|---|---|---|---|
| 7,155,252 B2* | 12/2006 | Martin | H04B 1/005 455/168.1 |
| 7,590,390 B2* | 9/2009 | Weber | H04B 7/04 455/287 |
| 8,260,347 B2* | 9/2012 | Tang | H04B 1/18 455/123 |
| 8,432,322 B2 | 4/2013 | Amm et al. | |
| 8,466,839 B2 | 6/2013 | Schlub et al. | |
| 8,577,289 B2 | 11/2013 | Schlub et al. | |
| 8,626,085 B2* | 1/2014 | Wang | H01Q 5/35 455/552.1 |

(Continued)

FOREIGN PATENT DOCUMENTS

WO     2013028886     2/2013

*Primary Examiner* — April G Gonzales
(74) *Attorney, Agent, or Firm* — Treyz Law Group, P.C.; G. Victor Treyz; Michael H. Lyons (57) ABSTRACT

An electronic device may be provided with a primary antenna that is used for transmitting and receiving signals and a secondary antenna that is used for receiving signals. The primary and secondary antennas may be used together in a diversity arrangement when receiving signals. The electronic device may have a transceiver. A phase shifter may be interposed between the transceiver and the secondary antenna. Control circuitry may select a communications band of interest for transmitting signals with the primary antenna. The control circuitry can adjust the phase shifter in real time based on which communications band of interest has been selected for transmission with the primary antenna. The phase shifter may impose a phase shift on signals carried between the secondary antenna and the transceiver that ensures that primary antenna efficiency degradation associated with the presence of the secondary antenna in the vicinity of the primary antenna is avoided.

19 Claims, 12 Drawing Sheets

(56) References Cited

U.S. PATENT DOCUMENTS

| | | | |
|---|---|---|---|
| 8,773,324 B2* | 7/2014 | Ozden | H01Q 1/242 343/850 |
| 8,896,488 B2 | 11/2014 | Ayala Vazquez et al. | |
| 8,952,860 B2 | 2/2015 | Li et al. | |
| 2006/0189289 A1* | 8/2006 | Robert | H01Q 3/2605 455/276.1 |
| 2006/0293097 A1* | 12/2006 | Shimizu | H01Q 1/242 455/575.7 |
| 2010/0128761 A1* | 5/2010 | Cornwell | H04K 3/42 375/219 |
| 2011/0140982 A1* | 6/2011 | Ozden | H01Q 1/242 343/852 |
| 2012/0068893 A1* | 3/2012 | Guterman | H01Q 1/2266 343/702 |

* cited by examiner

ELECTRONIC DEVICE WITH ANTENNAS ISOLATED USING PHASE SHIFTER

BACKGROUND

This relates generally to electronic devices and, more particularly, to electronic devices with antennas.

Electronic devices often include antennas. For example, cellular telephones, computers, and other devices often contain antennas for supporting wireless communications.

It can be challenging to form electronic device antenna structures with desired attributes. In some wireless devices, wireless communications are handled using multiple antennas. This can pose challenges. If care is not taken, the presence of one antenna can adversely affect the performance of another antenna. Antennas can be isolated from each other by separating the antennas by large distances, but this leads to bulky devices. Antennas can also be isolated from each other by designing the antennas to reduce coupling. Such designs may not be effective over a desired range of frequencies.

It would therefore be desirable to be able to provide improved wireless circuitry for electronic devices that contain multiple antennas.

SUMMARY

An electronic device may be provided with multiple antennas such as a primary antenna that is used for transmitting and receiving signals and a secondary antenna that is used for receiving signals. The electronic device may be provided with a housing such as a metal housing. The primary and secondary antennas may be located adjacent to each other along an edge of an electronic device housing. The primary and secondary antennas may be formed from antenna resonating elements such as inverted-F antenna resonating elements that share a common ground plane. The ground plane may be formed from portions of the metal electronic device housing.

The primary and secondary antennas may be used together in a diversity arrangement when receiving signals. Signals may be transmitted by the primary antenna in a communications band of interest. Transceiver circuitry may be coupled to the primary and secondary antennas using respective transmission line paths.

A phase shifter may be interposed in a transmission line path between the transceiver circuitry and the secondary antenna. Control circuitry may be used to select the communications band of interest for transmitting signals with the primary antenna. The control circuitry can adjust the phase shifter based on information on which communications band of interest has been selected for transmission with the primary antenna. The phase shifter may impose a phase shift on signals carried between the secondary antenna and the transceiver that avoids primary antenna efficiency degradation associated with the presence of the secondary antenna in the vicinity of the primary antenna.

DETAILED DESCRIPTION

Electronic devices may be provided with antennas. There may be multiple antennas mounted in the vicinity of each other in a device. For example, a pair of antennas may be used in a device. A first of the antennas, which may sometimes be referred to as a primary antenna, may be used in transmitting and receiving wireless signals. A second of the antennas, which may sometimes be referred to as a secondary antenna, may be used in receiving wireless signals. An electronic device may use a phase shifter to ensure that the impedance of the transmission line path and transceiver circuitry that serve to terminate the secondary antenna is appropriately mismatched with respect to the primary antenna, so that antenna efficiency for the primary antenna is not degraded by the presence of the secondary antenna while operating in a frequency band of interest. The phase shifter may be adjusted to support operation in a variety of different communications bands without primary antenna performance degradation.

Illustrative electronic devices that have wireless circuitry with phase shifter circuitry to ensure efficient antenna operation over a variety of communications bands are shown in FIGS. 1, 2, 3, and 4.

Figure 1:
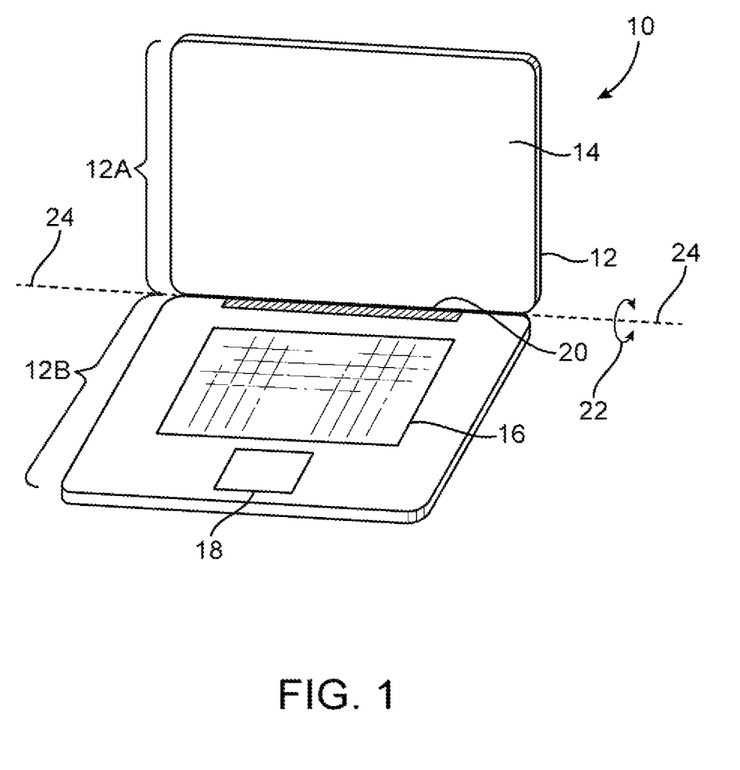
FIG. 1 is a perspective view of an illustrative electronic device such as a laptop computer with wireless circuitry in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes referred to as a display housing or lid, is placed in a closed position by rotating upper housing 12A towards lower housing 12B about rotational axis 24. Antenna structures may be located in housing 12A, in housing 12B, and in hinge structures 20.

Figure 2:
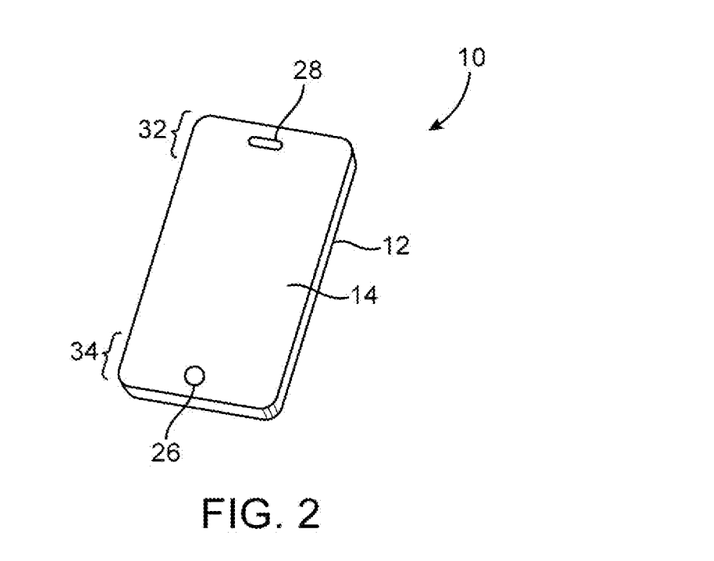
FIG. 2 is a perspective view of an illustrative electronic device such as a handheld electronic device with wireless circuitry in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28. Antennas in device 10 of FIG. 2 may be located at locations in housing 12 such as upper end 32 and lower end 34.

Figure 3:
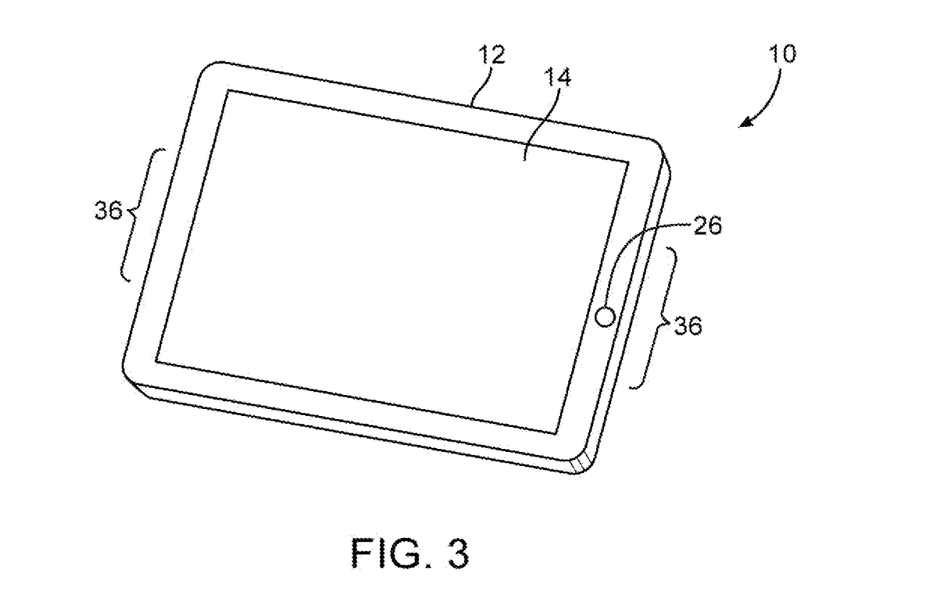
FIG. 3 is a perspective view of an illustrative electronic device such as a tablet computer with wireless circuitry in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26. Antennas may be located in regions such as one or more regions 36 along the edge of housing 12 and display 14.

Figure 4:
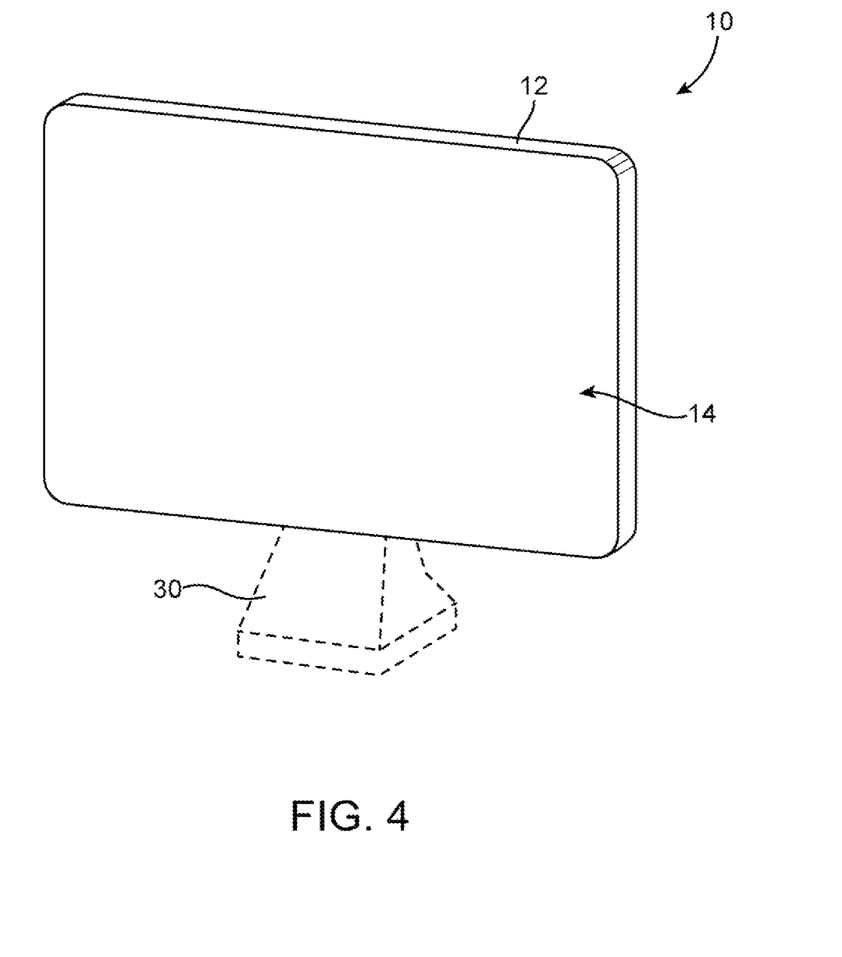
FIG. 4 is a perspective view of an illustrative electronic device such as a display for a computer or television with wireless circuitry in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table top or desk. Antennas for device 10 of FIG. 4 may be located along one or more of the edges of display 14, on the rear surface of housing 12, an in stand 30.

Antennas may be provided in other electronic devices if desired. In general, device 10 may be computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. The illustrative configurations for device 10 that are shown in FIGS. 1, 2, 3, and 4 are merely illustrative.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 of device 10 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Figure 5:
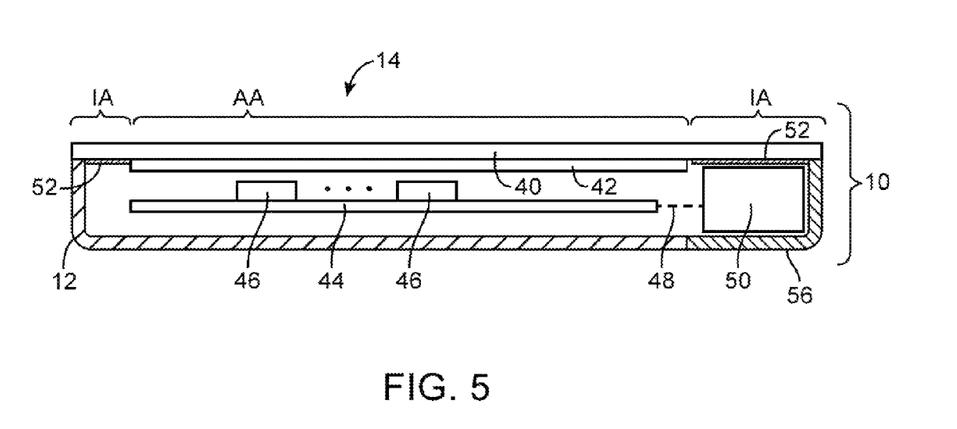
FIG. 5 is a cross-sectional side view of an electronic device with wireless circuitry in accordance with an embodiment.

A cross-sectional side view of an illustrative electronic device of the type that may be provided with antenna structures is shown in FIG. 5. As shown in FIG. 5, display 14 in device 10 may have display cover layer 40 and display module 42. Display layers in display module 42 may include display pixels formed from liquid crystal display (LCD) components or other suitable display pixel structures such as organic light-emitting diode display pixels, electrophoretic display pixels, plasma display pixels, etc. The display pixels may be arranged in an array having numerous rows and columns to form a rectangular active area AA that is surrounded by an inactive border region such as inactive area IA. When viewed from the front of display 14, inactive area IA may have the shape of a rectangular ring.

Display cover layer 40 may cover the surface of display 14 or a display layer such as a color filter layer (e.g., a layer formed from a clear substrate covered with patterned color filter elements) or other portion of a display may be used as the outermost (or nearly outermost) layer in display 14. The outermost display layer may be formed from a transparent glass sheet, a clear plastic layer, or other transparent member. To hide internal components from view, the underside of the outermost display layer or other display layer surface in inactive area IA may be coated with opaque masking layer 52 (e.g., a layer of opaque ink such as a layer of black ink).

Antenna structures 50 may be mounted under inactive area IA. Antenna structures 50 may include one or more antennas for device 10. Antenna structures 50 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands.

If desired, antenna structures 50 may be provided with tunable circuitry. The tunable circuitry may include switching circuitry based on one or more switches. The switching circuitry may, for example, include a switch that can be placed in an open or closed position. When control circuitry in device 10 places the switch in its open position, an antenna may exhibit a first frequency response. When the control circuitry places the switch in its closed position, the antenna may exhibit a second frequency response. Tunable circuitry for one or more antennas in antenna structures 50 may also be based on switching circuitry that can switch selected circuit components into use. For example, an adjustable inductor may operate in a first mode in which a first inductor is switched into use and a second mode in which a second inductor is switched into use. An adjustable inductor may optionally also be switched into a configuration in which a short circuit is switched into use or in which an open circuit is formed.

Opaque masking layer 52 and display cover layer 40 may be radio-transparent, so that radio-frequency antenna signals can be transmitted and received through display cover layer 40 in inactive area IA and opaque masking layer 52. Housing 12 may be formed from a dielectric such as plastic that is transparent to radio-frequency signals or may be formed from a material such as metal in which an antenna window such as antenna window 56 has been formed. Antenna window 56 may be formed from a dielectric such as plastic, so that antenna window 56 is transparent to radio-frequency signals. During operation, antenna signals associated with antenna structures 50 may pass through the portions of display 14 in inactive area IA that overlap antenna structures 50 and/or through antenna window 56 and/or other dielectric portions of housing 12.

Device 10 may contain electrical components 46. Components 46 may be mounted on one or more substrates such as printed circuit 44. Printed circuit 44 may be a rigid printed circuit board (e.g., a printed circuit formed from a rigid printed circuit board material such as fiberglass-filled epoxy) or a flexible printed circuit (e.g., a flex circuit formed from a sheet of polyimide or other layer of flexible polymer). Electrical components 46 may include integrated circuits, connectors, sensors, light-emitting components, audio components, discrete devices such as inductors, capacitors, and resistors, switches, and other electrical devices. Paths such as path 48 may be used to couple antenna structures 50 to wireless circuitry on substrates such as printed circuit 44. Paths such as path 48 may include transmission line paths such as stripline transmission lines, microstrip transmission lines, coplanar transmission lines, coaxial cable transmission lines, transmission lines formed on flexible printed circuits, transmission lines formed on rigid printed circuit boards, or other signal paths.

Figure 6:
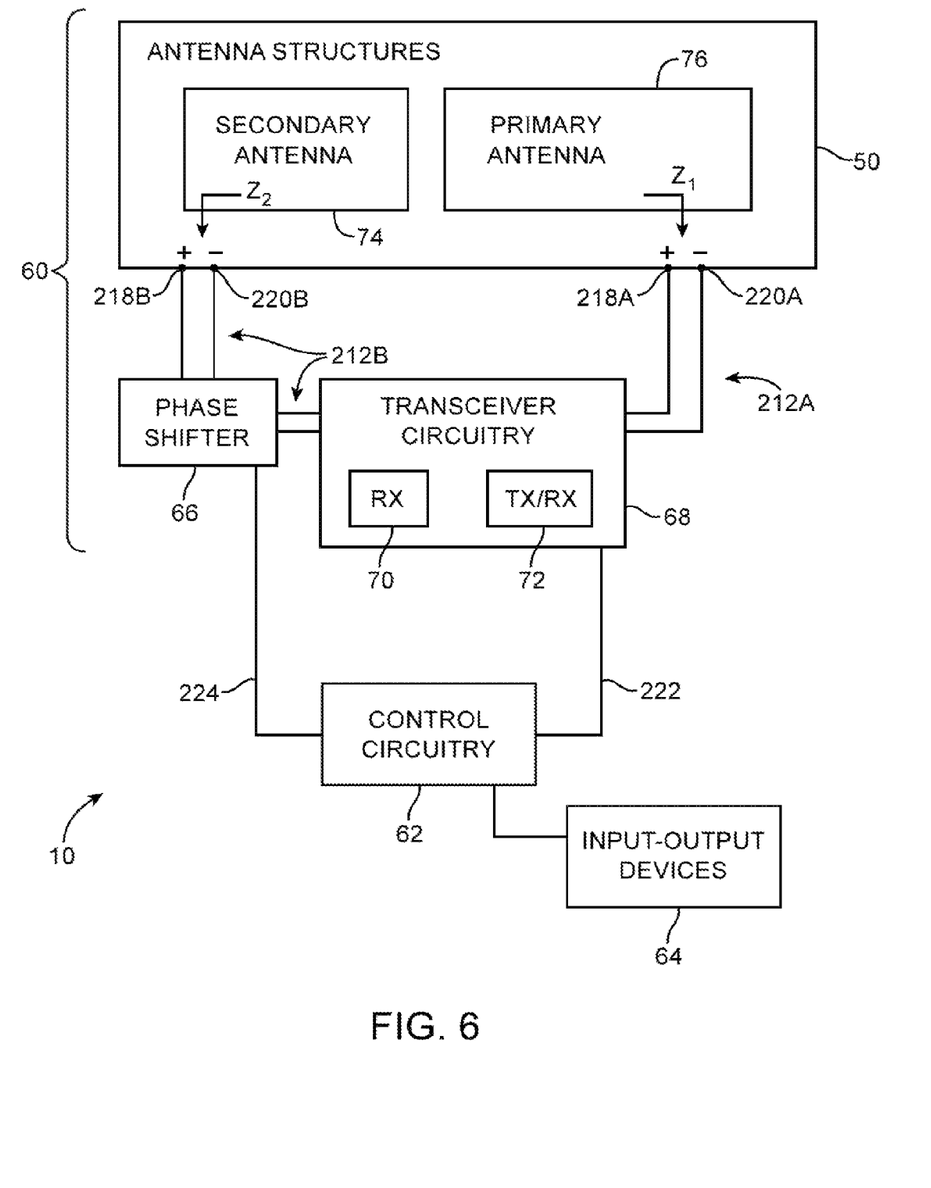
FIG. 6 is a schematic diagram of an illustrative electronic device in accordance with an embodiment.

FIG. 6 is a diagram showing how antenna structures 50 may include multiple antennas. As shown in FIG. 6, electronic device 10 may include wireless circuitry 60. Wireless circuitry 60 may include antenna structures 50, radio-frequency transceiver circuitry 68, and phase shifter 66.

Antenna structures 50 may include multiple antennas such as antenna 76 and antenna 74. Antenna 76, which may sometimes be referred to as a primary antenna, may be used for transmitting and receiving wireless signals (as an example). Antenna 74, which may sometimes be referred to as a secondary antenna, may be used for receiving wireless signals (as an example). Other antenna configurations may be used in device 10 if desired (e.g., configurations with different numbers of antennas, configurations in which each antenna is used for both transmitting and receiving antenna signals, etc.). The configuration of FIG. 6 is merely illustrative.

Transceiver circuitry 68 may include transmitters and receivers for transmitting and receiving antenna signals through antenna structures 50. For example, transceiver circuitry 68 may have a transmitter-receiver 72 for transmitting and receiving antenna signals and a receiver such as receiver 70 for receiving antenna signals. Receiver 70 may, as an example, be configured to receive signals at the same communications frequencies as the receiver circuitry in transmitter receiver 72. Transmission line 212A may be used to route signals between transceiver circuitry 68 (e.g., transmitter-receiver 72) and a first antenna feed formed from positive antenna feed terminal 218A and ground antenna feed terminal 220A. Transmission line 212B may be used in conveying signals between a second antenna feed that is formed from positive antenna feed terminal 218B and ground antenna feed terminal 220B and transceiver circuitry 68 (e.g., receiver 70).

Phase shifter 66 may be interposed within transmission line 212B and may be used to control the phase of signals being conveyed between the second antenna feed and transceiver circuitry 68. These phase adjustments may help ensure that the antenna efficiency of primary antenna 76 is not adversely affected due to the presence of secondary antenna 74. Primary antenna 76 may be coupled to the antenna feed formed from positive antenna feed terminal 218A and ground antenna feed 220A and may be coupled to transmitter-receiver 72 by transmission line 212A. Secondary antenna 74 may be coupled to the antenna feed formed from positive antenna feed terminal 218B and ground antenna feed terminal 220B and may be coupled to receiver 70 by transmission line 212B.

The antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc. With one suitable arrangement, secondary antenna 74 serves as a diversity antenna. Outgoing wireless signals are transmitted using primary antenna 76. Incoming signals are received by primary antenna 76 and/or secondary antenna 74 in an antenna diversity arrangement.

As shown in FIG. 6, electronic device 10 may include control circuitry 62. Control circuitry 62 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 62 may be used to control the operation of device 10. The processing circuitry may be based on one or more microprocessors, microcontrollers, digital signal processors, baseband processors, power management units, audio codec chips, application specific integrated circuits, etc.

Control circuitry 62 may be used to run software on device 10, such as internet browsing applications, voice-over-internet-protocol (VOIP) telephone call applications, email applications, media playback applications, operating system functions, etc. To support interactions with external equipment, control circuitry 62 may be used in implementing communications protocols. Communications protocols that may be implemented using the storage and processing circuitry of control circuitry 62 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 62 may be configured to implement control algorithms that control the use of antennas in device 10. For example, circuitry 62 may perform signal quality monitoring operations, sensor monitoring operations, and other data gathering operations and may, in response to the gathered data and/or information on which communications bands are to be used in device 10, control which antenna structures within device 10 are being used to receive and process data and/or may adjust one or more switches, tunable elements, or other adjustable circuits in device 10 to adjust antenna performance. As an example, circuitry 62 may control the operation of phase shifter 66 to help ensure that antenna structures 50 perform optimally when handling signals in various communications bands. Adjustments to phase shifter 66 may be made, for example, based on information on which frequency band(s) transmitter-receiver 72 is currently using to transmit and receive antenna signals through primary antenna 76. Control circuitry 62 may also select which of antennas 76 and 74 to use in receiving signals in real time based on received signal strength information, based on sensor data, based on information on which communications band(s) are being used, etc.

Control circuitry 62 may use paths such as path 224 to issue control signals to phase shifter 66 in real time. Control circuitry 62 may use path 222 to provide signals to transceiver circuitry 68 for transmission over antenna 76 and may use path 222 to receive signals from transceiver circuitry 68 that transceiver circuitry 68 has wirelessly received using antenna 76.

In performing control operations on wireless circuitry 60, circuitry 62 may open and close switches, may turn on and off receivers and transmitters, may adjust impedance matching circuits, may make phase adjustments using phase shifter 66, may configure switches in front-end-module (FEM) radio-frequency circuits that are interposed between radio-frequency transceiver circuitry 68 and antenna structures 50 (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry in device 10 such as input-output devices 64 may be used to allow data to be supplied to device 10 and to allow data to be provided from device 10 to external devices. Input-output devices 64 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 64 and may receive status information and other output from device 10 using the output resources of input-output devices 64.

The presence of antenna 74 in the vicinity of antenna 76 gives rise to the potential for electromagnetic signal coupling between antennas 76 and 74. Antennas 76 and 74 are terminated with respective impedances Z1 and Z2, as shown in FIG. 6. The impedance Z2 of the path and transceiver that are coupled to secondary antenna 74 and that therefore serve as a termination for the secondary antenna can influence currents in antenna ground structures for antennas 76 and 74 that ultimately affect primary antenna performance. As an example, consider a scenario in which transceiver 68 is used to cover cellular telephone communications bands such as LTE band 20, band 13, band 17, band 8, etc. (i.e., various 700 MHz to 960 MHz communications bands). When transmitting at frequencies such as these using primary antenna 76, the presence of secondary antenna 74 in the vicinity of antenna 76 (e.g., within 10 cm or less, within 5 cm or less, within 3 cm or less, etc.) can lead to additive ground plane currents that do not adversely affect the efficiency of primary antenna 76 or can lead to cancelling ground plane currents that tend to reduce the efficiency of primary antenna 76. Phase shifter 66 can be adjusted by control circuitry 62 to ensure that the cancelling ground plane current scenario arises only at out-of-band frequencies (i.e., frequencies out of the communications band in which transmitter circuitry in transmitter-receiver 72 is transmitting signals with primary antenna 76). The use of phase shifter 66 therefore helps avoid primary antenna efficiency degradation due to the presence of antenna 74.

Figure 7:
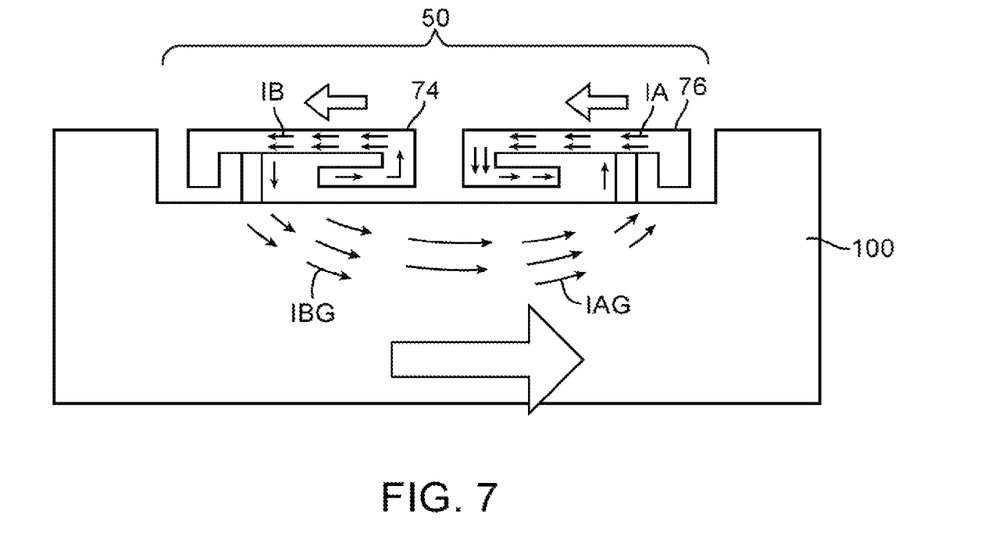
FIG. 7 is a diagram showing how antenna ground plane currents associated with two adjacent antennas may combine in an additive fashion that enhances antenna efficiency in accordance with an embodiment.

As shown in FIG. 7, antennas 76 and 74 may be formed from first and second antenna resonating elements (e.g., first and second respective inverted-F antenna resonating elements or antenna resonating elements of other designs) coupled to common ground plane 100. Antennas 76 and 74 may be located along an edge of housing 12 (e.g., in a position that overlaps antenna window 56 or other radio-transparent structures). Ground plane 100 may be formed from portions of housing 12 (e.g., metal housing structures such as a metal rear housing wall, a side wall, or other housing wall structures and/or internal metal structures), may be formed from ground plane traces on a printed circuit board, may be formed form conductive structures in electrical components in device 10, or may be formed form other conductive structures.

The impact of a secondary antenna such as secondary antenna 74 of FIG. 7 that is adjacent to primary antenna 76 depends on the impedance Z2 with which secondary antenna 74 is terminated. In the scenario of FIG. 7, impedance Z2 is matched to impedance Z1 (e.g., Z1 and Z2 may both be 50 ohms). During operation of antenna 76 in this situation, currents IA that flow in antenna 76 are coupled into antenna 74 in a way that leads to induced currents IB that are in phase with currents IA. As a result, ground plane currents IAG associated with antenna 76 and ground plane currents IBG associated with antenna 74 tend to add to each other. The additive nature of the ground plane currents of antennas 74 and 76 in the FIG. 7 scenario leads to good efficiency for antenna 76. This configuration may, however, be difficult to achieve in practice, because it may be desirable to form the transmission line paths that are coupled to the feeds for antennas 74 and 76, respectively, so that these transmission line paths (i.e., the terminations for antennas 74 and 76) have different impedances and thereby reduced crosstalk and coupling.

Figure 8:
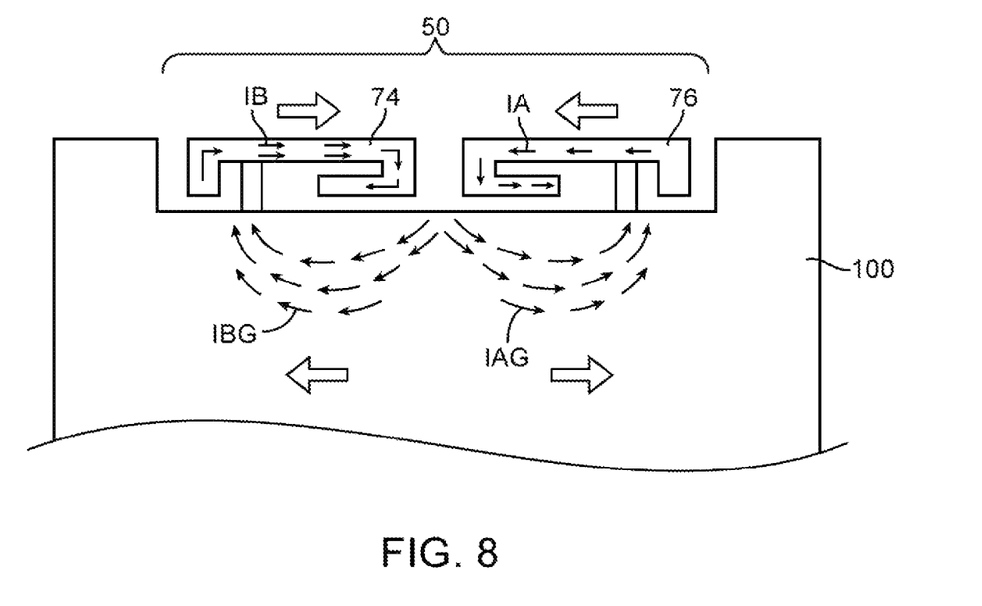
FIG. 8 is a diagram showing how antenna ground plane currents associated with two adjacent antennas may tend to cancel each other and thereby reduce antenna efficiency in accordance with an embodiment.

The scenario depicted in FIG. 8 involves an impedance Z2 that is mismatched with respect to impedance Z1. In this scenario, antenna ground plane currents IBG of antenna 74 and antenna ground plane currents IAG of antenna 76 tend to cancel each other at some operating frequencies, thereby decreasing the efficiency of antenna 76 at those operating frequencies. It may be desirable to configure transmission line 212B to exhibit a different impedance from path 212A to prevent coupling and crosstalk on the printed circuit board or other substrate on which transmission lines 212A and 212B are formed. Impedance mismatches can reduce crosstalk and coupling, but, if care is not taken, can lead to an undesired drop in efficiency for primary antenna 76 when operating in a communications band of interest.

To ensure that a desired efficiency is maintained in the communications band of interest for transmitting antennas with primary antenna 76, phase shifter 66 may be used to adjust the phase of the signals traveling between secondary antenna 74 and transceiver circuitry 68 when primary antenna 76 is handling signals in the communications band of interest. These phase adjustments may move efficiency losses out of the communications band of interest, thereby preserving a desired antenna efficiency for primary antenna 76.

Figure 9:
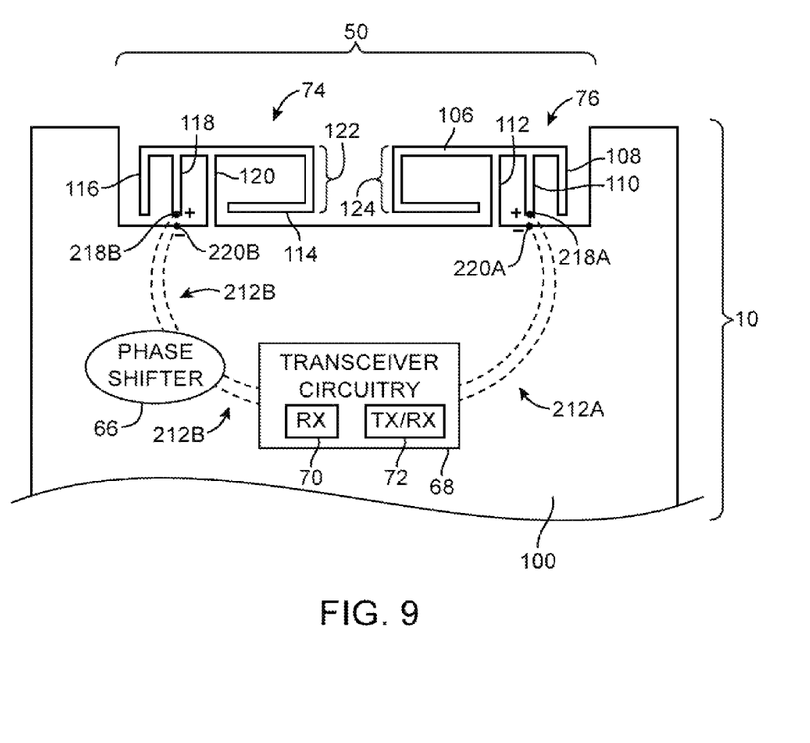
FIG. 9 is a diagram of an illustrative pair of adjacent antennas and associated wireless circuitry having a phase shifter in accordance with an embodiment.

FIG. 9 is a diagram of illustrative inverted-F antenna resonating element structures that may be used in forming antennas 76 and 74. As shown in FIG. 9, antenna 76 may have an inverted-F antenna resonating element 124. Inverted-F antenna resonating element 124 may have one or more arms such as long arm (low band arm) 106 and short arm (high band arm) 108. Positive feed terminal 218A may be coupled to feed arm 110 of resonating element 124, which runs parallel to return path 112. Antenna 74 may have an inverted-F antenna resonating element 122. Inverted-F antenna resonating element 122 may have one or more arms such as long arm (low band arm) 114 and short arm (high band arm) 116. Positive feed terminal 218B may be coupled to feed arm 118 of resonating element 124, which runs parallel to return path 120. Phase shifter 66 may be interposed in transmission line signal path 212B between antenna 74 and transceiver circuitry 68.

Figure 10:
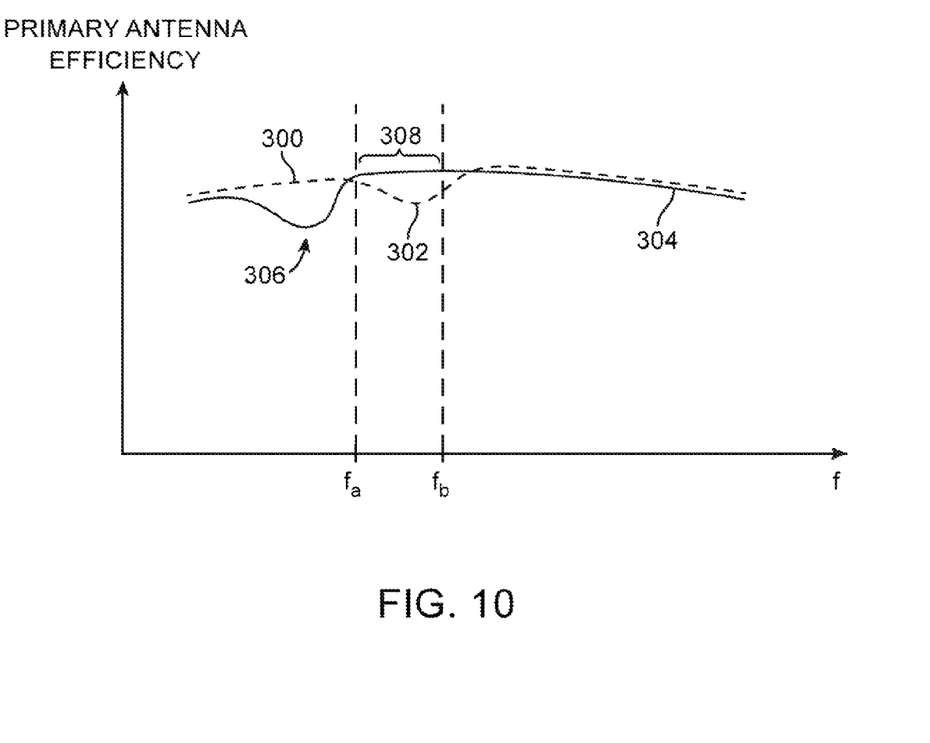
FIG. 10 is a graph in which antenna efficiency has been plotted as a function of operating frequency for a primary antenna in the pair of antennas of FIG. 9 under two different phase shifter settings in accordance with an embodiment.

FIG. 10 is a graph in which antenna efficiency for primary antenna 76 has been plotted as a function of operating frequency f. It may be desired to operate antenna 76 in a communications band extending from frequency fa to frequency fb (e.g., a low band cellular telephone band or other suitable communications band of interest). Phase shifter 66 imparts a phase shift to antenna signals carried between secondary antenna 74 and transceiver circuitry 68. Phase shifter 66 may be a variable phase shifter that is controlled in real time by control circuitry 62. Control circuitry 62 may, for example, determine which communications band is being actively used by transceiver 68 and primary antenna 76 to transmit and receive wireless signals. In response to determining which communications band is currently active, control circuitry 62 can issue control signals on path 224 that adjust phase shifter 66 so that a desired amount of phase shift is imparted to path 212B. The amount of phase shift to be used when operating in each communications band may be determined empirically (e.g., by calibrating device 10 during manufacturing).

In the absence of an appropriate phase shift from phase shifter 66, antenna 76 may be characterized by antenna efficiency curve 300. As shown in FIG. 10, curve 300 may be characterized by a decrease in efficiency (decrease 302) at frequencies that lie within the communications band of interest (i.e., the band extending from fa to fb in the example of FIG. 10). This decrease in antenna efficiency would degrade wireless performance (e.g., the decrease in efficiency would require larger transmit powers to be used when transmitting signals, thereby depleting battery energy unnecessarily).

When, however, the phase of phase shifter 66 is adjusted to impart a 180° phase shift or other appropriate phase (e.g., a phase determined through calibrating device 10 during manufacturing) to the signals traveling on path 212B, primary antenna 76 may be characterized by antenna efficiency curve 304. As shown in FIG. 10, the efficiency drop associated with dip 306 of curve 304 is effectively shifted to frequencies below the communications band of interest (i.e., efficiency drop 302 at frequencies between fa and fb is shifted to the position occupied by efficiency drop 306 of FIG. 10, below frequency fa at the lower end of the communications band of interest). By shifting the low efficiency characteristic (dip 306) out of the communications band being used by primary antenna 76 (i.e., to a frequency below the communications band of interest), antenna efficiency for primary antenna 76 when operating within the communications band of interest may be maintained.

Figure 11:
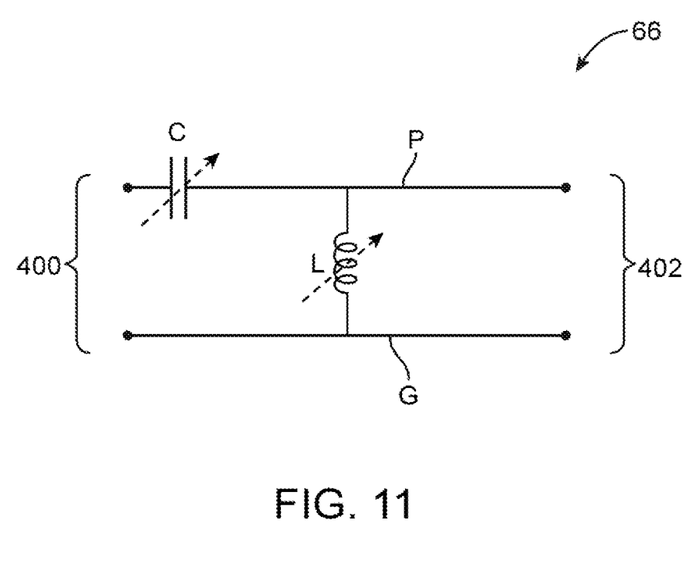
FIG. 11 is a circuit diagram of an illustrative variable phase shifter in accordance with an embodiment.

An illustrative adjustable phase shifter circuit that may be used in implementing phase shifter 66 is shown in FIG. 11. As shown in FIG. 11, phase shifter 66 may have a positive signal path P and a ground signal path G. Capacitor C may be coupled in series in path P between port 400 and port 402 of phase shifter 66. Inductor L may be coupled in a shunt configuration between positive signal line P and ground line G. Capacitor C may be a variable capacitor and/or inductor L may be a variable inductor to provide phase shifter 66 with the ability to be adjusted by control signals from control circuitry 62. During operation, port 400 may be coupled to antenna 74 and port 402 may be coupled to transceiver 68 (as an example). Other phase shifter circuits may be used to implement phase shifter 66 if desired. The configuration of FIG. 11 is provided as an example.

Figure 12:
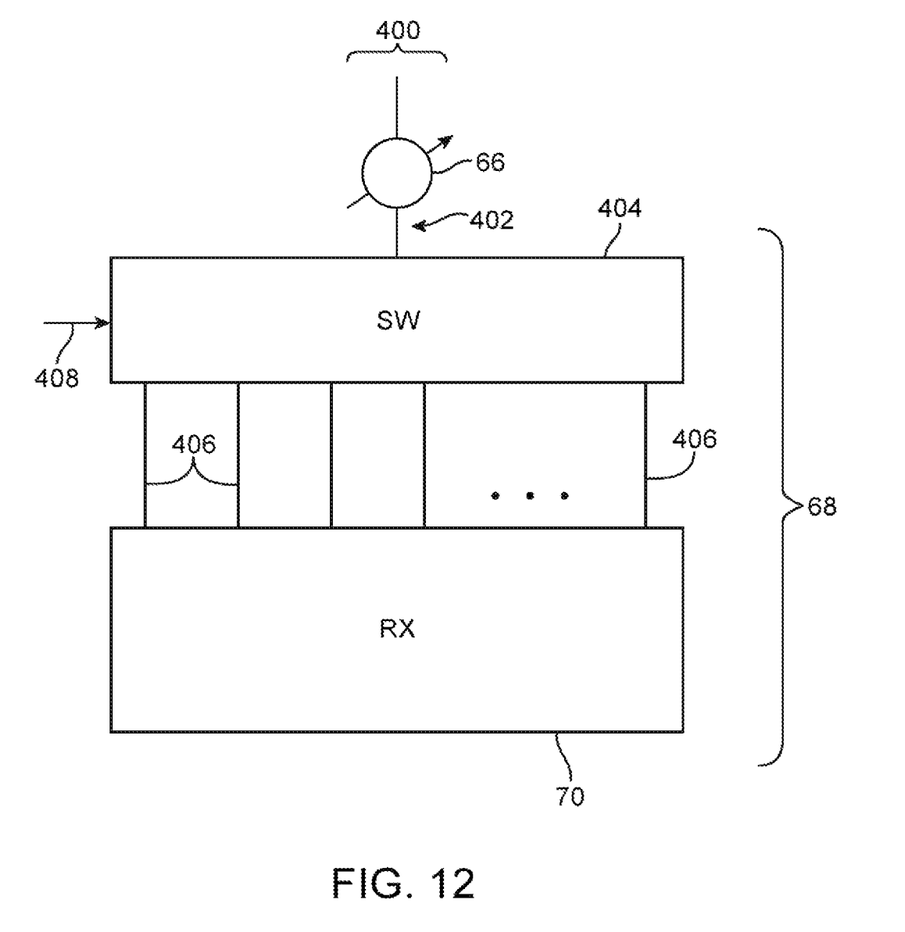
FIG. 12 is a circuit diagram of transceiver and phase shifter circuitry that may be used in an electronic device in accordance with an embodiment.

In the illustrative configuration of FIG. 12, phase shifter 66 has been coupled to switch 404 in transceiver circuitry 68. Switch 404 may receive control signals on input 408 (e.g., control signals from control circuitry 62). Switch 404 may be adjusted to couple port 402 of adjustable phase shifter 66 to a selected one of paths 406. Each of paths 406 may be coupled to a respective port of receiver 70. Each receiver port may be associated with a different respective communications band of interest. During operation, control circuitry 62 can adjust switch 404 to switch a desired communications band into use by receiver 70 (e.g., to receive signals via secondary antenna 74). Control circuitry 62 can also adjust circuitry associated with transmitter-receiver 72 to ensure that the receiver circuitry of transmitter-receiver 72 is receiving signals in the same communications band. The transmitter circuitry of transmitter-receiver 72 may be set to an appropriate associated transmit band. For each switch state of switch 404, phase shifter 66 may be directed to produce a corresponding phase shift appropriate for ensuring that antenna efficiency drops are shifted out of band and therefore do not overlap with the communications band being used by primary antenna 76 to transmit signals.

Figure 13:
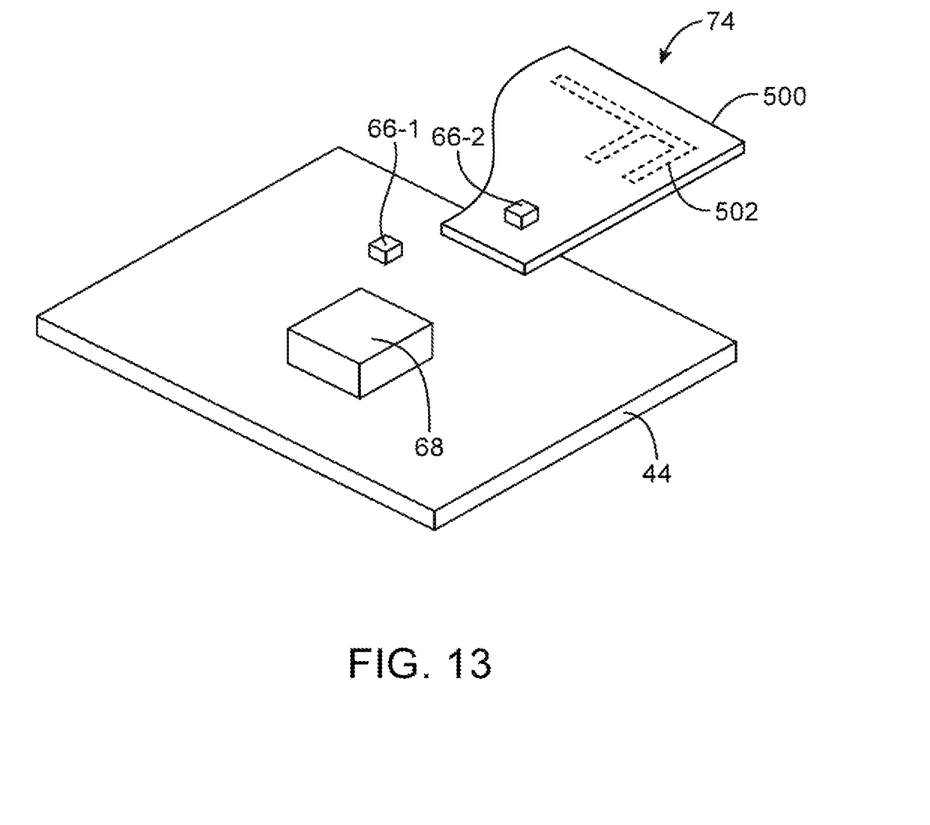
FIG. 13 is a perspective view of a printed circuit board coupled to a flexible printed circuit that includes antenna resonating element traces for an antenna in accordance with an embodiment.

FIG. 13 is a perspective view of an illustrative transceiver 68 mounted on an illustrative rigid printed circuit board 44. Antenna 74 (and, if desired, antenna 76) may be formed from traces such as patterned metal layer 502 on printed circuit 500. Printed circuit 500 may be coupled to printed circuit board 44 using solder or other conductive connections. Printed circuit 500 may be a flexible printed circuit (as an example). Phase shifter 66 may be implemented using phase shifter circuitry on printed circuit 500 such as phase shifter 66-2 and/or phase shifter circuitry on printed circuit board 44 such as phase shifter 66-1. Phase shifter circuitry can also be implemented using fixed length transmission line structures, circuitry on an integrated circuit such as portions of transceiver 68, discrete components (e.g., surface mount technology components), or other circuits.

Figure 14:
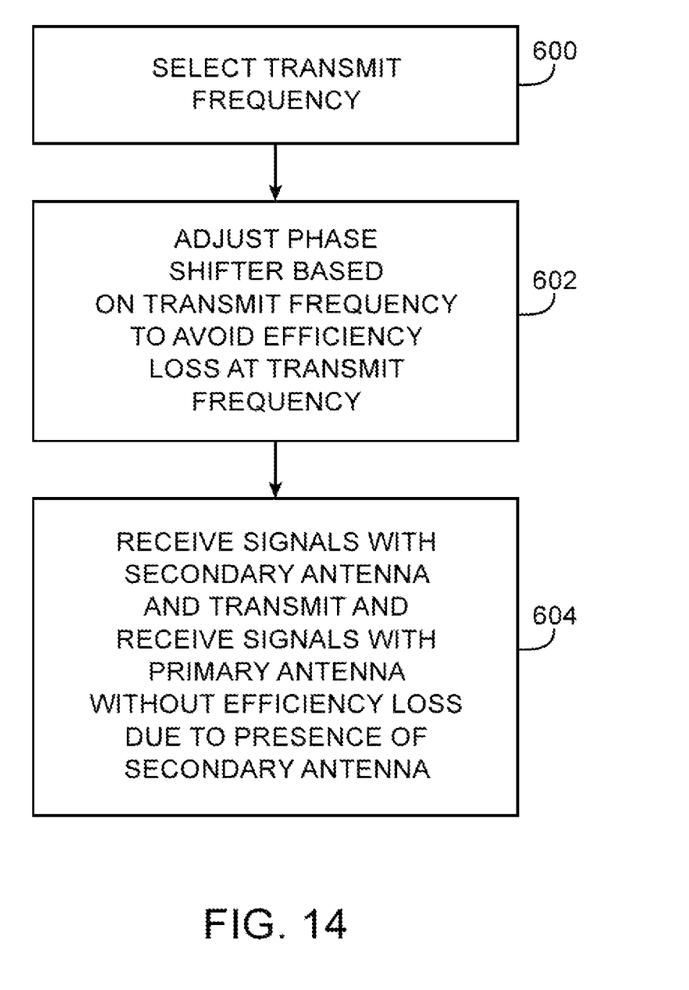
FIG. 14 is a flow chart of illustrative steps involved in operating an electronic device with wireless circuitry in accordance with an embodiment.

Illustrative steps involved in operating device 10 are shown in FIG. 14.

At step 600, control circuitry 62 (e.g., a microprocessor, a baseband processor integrated circuit, and/or other processing circuitry) can select a desired transmit frequency for primary antenna 76. The transmit frequency may fall within a communications band of interest such as the frequency band extending from frequency fa to frequency fb in the example of FIG. 10. Examples of frequency bands of interest include bands 13, 17, 5, 20, 8, etc. for LTE/UMTS.

At step 602, control circuitry 62 uses information on the current operating frequency and currently selected communications band to adjust phase shifter 66 so that any antenna efficiency reductions are moved out of band.

At step 604, device 10 can use antennas 74 and 76 in a diversity arrangement to receive signals (i.e., device 10 can dynamically switch between antennas 74 and 76 so that an optimum antenna is always maintained in use) and can use primary antenna 76 to transmit signals in the communications band of interest without loss of antenna efficiency due to the presence of secondary antenna 74.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a first antenna;
a second antenna;
radio-frequency transceiver circuitry coupled to the first and second antennas by respective first and second transmission lines;
a phase shifter interposed in the second transmission line;
control circuitry configured to adjust the phase shifter in response to transmission of signals in a communications band of interest with the first antenna; and
an electronic device housing, wherein the first and second antenna share a common ground plane that is formed from the electronic device housing, and the first and second antennas are surrounded on all but a single side by the common ground plane.

2. The electronic device defined in claim 1 wherein the first and second antennas are located along an edge of the electronic device housing.

3. The electronic device defined in claim 2 wherein the first and second antennas overlap a dielectric window in the electronic device housing.

4. The electronic device defined in claim 1 wherein the radio-frequency transceiver comprises a transmitter-receiver coupled to the first transmission line that is configured to operate in cellular telephone bands.

5. The electronic device defined in claim 4 wherein the radio-frequency transceiver comprises a receiver coupled to the second transmission line.

6. The electronic device defined in claim 5 wherein the communications band of interest includes a band in the frequency range of 700 MHz to 960 MHz.

7. The electronic device defined in claim 6 wherein the phase shifter includes an adjustable capacitor.

8. The electronic device defined in claim 6 wherein the phase shifter includes an adjustable inductor.

9. A method of operating an electric device having primary and secondary antennas, comprising:
selecting a communications band of interest for transmitting radio-frequency signals with the primary antenna;
adjusting a phase shifter to maintain a desired antenna efficiency when transmitting the radio-frequency signals in the communications band of interest, wherein the phase shifter is interposed in a transmission line path that couples the secondary antenna to a radio-frequency transceiver having a plurality of receiver ports; and
controlling switching circuitry interposed between the phase shifter and the radio-frequency transceiver to couple the phase shifter to a selected receiver port of the plurality of receiver ports, wherein the radio-frequency transceiver is mounted to a printed circuit board and the phase shifter is mounted to a flexible printed circuit board that is coupled to the printed circuit board.

10. The method defined in claim 9 wherein adjusting the phase shifter comprises imposing a phase shift on antenna signals from the secondary antenna.

11. The method defined in claim 10 wherein the radio-frequency transceiver comprises a receiver, the method further comprising receiving antenna signals with the receiver from the secondary antenna through the phase shifter.

12. The method defined in claim 11 wherein the radio-frequency transceiver comprises a transmitter-receiver, the method further comprising using the transmitter-receiver to transmit the radio-frequency signals in the communications band of interest.

13. The method defined in claim 12 wherein using the transmitter-receiver comprises transmitting the radio-frequency signals in a communications band between 700 MHz and 960 MHz.

14. An electronic device, comprising:
a first antenna;
a second antenna;
a radio-frequency receiver;
a variable phase shifter;
control circuitry that adjusts the variable phase shifter when transmitting signals with the first antenna to avoid antenna efficiency degradation for the first antenna due to presence of the second antenna;
a housing in which the first and second antennas are mounted, wherein the first and second antennas comprise patterned metal on a flexible printed circuit;
a display in the housing that is covered by a display cover layer, wherein the flexible printed circuit is overlapped by a portion of the display cover layer and radio-frequency signals for the first and second antennas pass through the display cover layer; and
a printed circuit board coupled to the flexible printed circuit, wherein the radio-frequency receiver is mounted to the printed circuit board and the variable phase shifter is mounted to the flexible printed circuit.

15. The electronic device defined in claim 14 wherein the housing comprises metal that forms a common antenna ground plane for the first and second antennas.

16. The electronic device defined in claim 15 wherein the radio-frequency receiver is coupled to the second antenna by a signal path, and the variable phase shifter is interposed in the signal path.

17. The electronic device defined in claim 15 further comprising a radio-frequency transmitter-receiver coupled to the first antenna that transmits signals in cellular telephone bands.

18. The method defined in claim 9, wherein each receiver port of the plurality of receiver ports is associated with a different respective communications band and controlling the switching circuitry comprises:
controlling the switching circuitry to couple the phase shifter to a selected receiver port of the plurality of receiver ports that is associated with the communications band of interest used by the primary antenna for transmitting the radio-frequency signals.

19. The method defined in claim 10, wherein adjusting the phase shifter comprising:
controlling the phase shifter to exhibit a different corresponding phase shift on the antenna signals from the secondary antenna based on which receiver port of the plurality of receiver ports is coupled to the phase shifter by the switching circuitry.

* * * * *